FERROMAGNETIC COBALT PARTICLES

INVENTORS
JOHN R. THOMAS
OLIVER L. HARLE
BY
ATTORNEYS

FERROMAGNETIC COBALT PARTICLES

INVENTORS
JOHN R. THOMAS
OLIVER L. HARLE
BY P. E. Johnston
Bertram Rowland
ATTORNEYS

FERROMAGNETIC COBALT PARTICLES

INVENTORS
*JOHN R. THOMAS*
*OLIVER L. HARLE*
BY F. E. Johnston
Bertram Rowland
ATTORNEYS United States Patent Office 3,228,882
Patented Jan. 11, 1966

3,228,882
DISPERSIONS OF FERROMAGNETIC COBALT PARTICLES

Oliver L. Harle, Berkeley, and John R. Thomas, Lafayette, Calif., assignors to Chevron Research Company, a corporation of Delaware Filed Jan. 4, 1963, Ser. No. 249,526
24 Claims. (Cl. 252—62.5)

Figure 1:
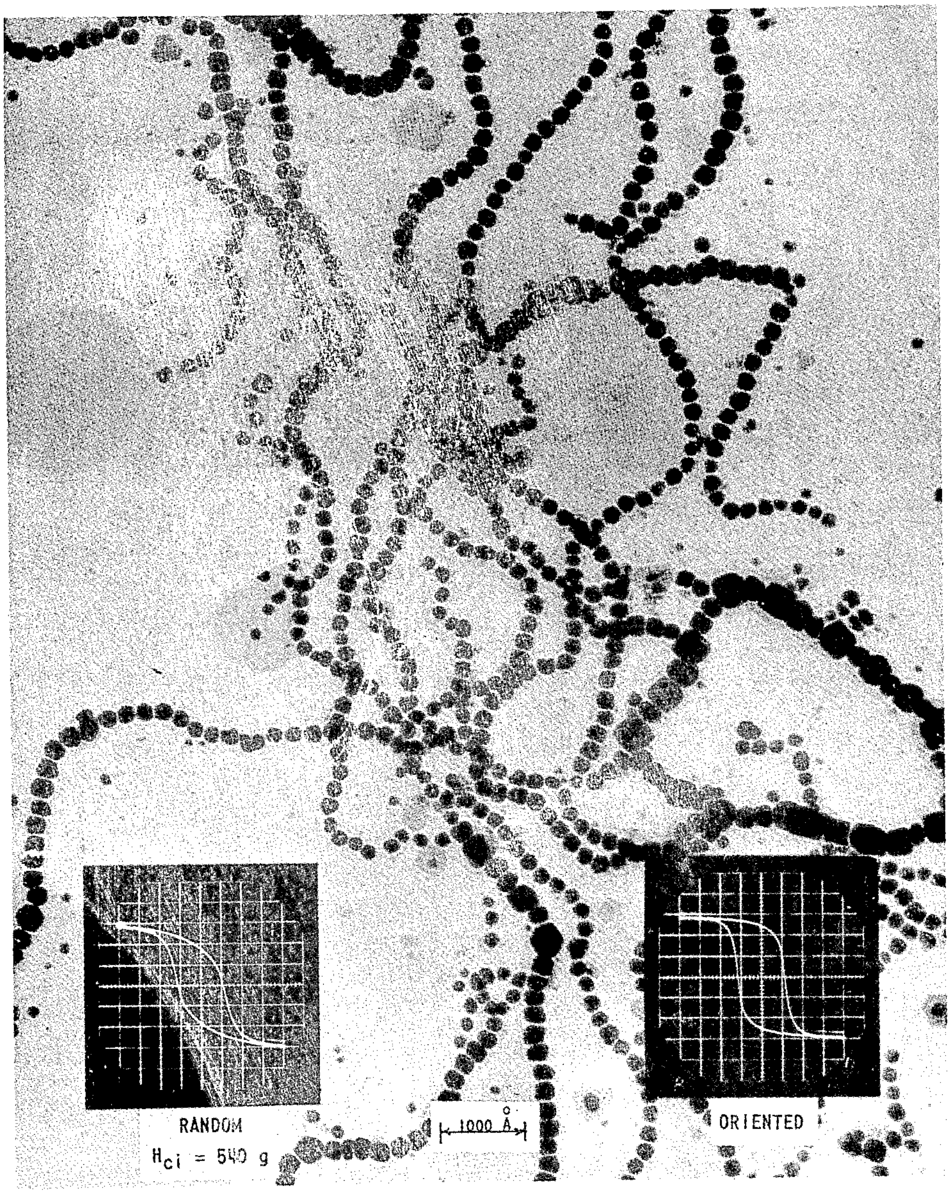

This application is a continuation-in-part of applications filed by Oliver L. Harle and John R. Thomas, Serial Nos. 183,731, 183,732, 183,733, 183,734 all filed on March 30, 1962 and all now abandoned.

This invention concerns the preparation and composition of ferromagnetic cobalt particles. More particularly this invention concerns the preparation and composition of ferromagnetic cobalt particles existing in an organized arrangement dispersed in an organic medium.

Magnetic materials have a wide variety of applications. Of particular interest to present-day technology are particles which are single domain. Many metal particles greater than 1,000 A. are found to be multidomain; the particles or crystals have a number of areas in which the magnetization vectors are in different directions. The direction of the magnetization vector does not abruptly change between two areas or domains. Rather, the domains are separated by a domain boundary or Bloch wall, the wall permitting a gradual change of direction in the magnetization vector. When the particle or crystal is subjected to an external field, the domain boundary moves so as to enhance those domains which are aligned with the field, at the expense of those domains which are unaligned. The boundary wall movement results in an increased magnetic induction in the particle.

The boundary wall requires a finite volume. Therefore, particles can be prepared which are too small to maintain two domains and a boundary wall. These particles are referred to as single domain.

In the absence of a boundary wall, the particles respond to the field by rotation of the magnetization vector. This is opposed by crystal anisotropy. For, in a ferromagnetic crystal, there are easy axes of magnetization. When the easy axis is not aligned with the field, the magnetization vector will rotate into a non-preferred position. The rotation of the magnetization vector in opposition to the crystal anisotropy requires greater energy than the movement of a boundary wall. The difficulty in rotating the magnetization vector is reflected in the coercive force. The coercive force is the field necessary to bring the magnetic induction (B) in a sample magnetized by a field H back to zero.

Crytal anisotropy is not the only factor in determining the coercive force. Four other types of anisotropy are said to contribute: shape, strain, surface and exchange. In the present invention, most of the concern will be directed toward crystal anisotropy and shape anisotropy.

It has now been found that cobalt particles having ferromagnetic properties and being single domain can be prepared existing in an organized arrangement by the decomposition of a cobalt-organic compound in the presence of an inert solvent and a polymer of at least 1,000 molecular weight.

The metal particles prepared in this invention are predominantly cobalt metal. Their shape is generally roughly spherical, cylindrical or parallelepiped. The particles range in size from about 100 to 1,000 A. and preferably 150 to 750 A. (75%, preferably 85%, by weight of the metal present is in the form of particles of the designated size range.) Because of the small size of the particles, they are single domain.

The particles are found to be of relatively uniform size. In most of the preparations, the particles do not differ by more than a factor of 2 from the mean size—as measured by the longest edge, axis, or diameter of the particle. (Usually 85% of the weight of the metal is present as particles of the designated size range.) In preferred samples, the particles will not differ by more than a factor of 1.5 from the mean size (±50% from the mean size, with at least 75% by weight of the metal present as particles in the designated size range.)

The particles which are not spherical, which customarily appear rectangular in the photomicrograph, will generally have a ratio of the longer edge to the shorter edge of not greater than two, and more generally, not greater than 1.5.

FIGURES 1–9 are electron photomicrographs of the particles prepared by the method of this invention.

The particles prepared in this invention do not exist randomly dispersed, but assume an organized arrangement. They appear similar to the arrangement of streptococci. The organization is that of a line, chain or string of beads. Occasionally, the chain will close to form a circle. The chains have at least 5 members; usually, 10 or more members, and chains of 100 or more members have been noted. A particle in the chain is customarily separated by not more than 50 A., and preferably by not more than 20 A., from the adjoining particle in the chain, as evidenced by an electron photomicrograph. Customarily, at least 25% by weight of the metal will be present as particles in chains. Preferably 35% and more preferred 65% by weight. In particularly preferred preparations, 90% by weight of the metal will be present as particles in chains.

Each particle is surrounded by a polymer envelope. The polymer acts as a buffer and prevents the particles from bonding together to form larger aggregates or crystals. In this way, the particles remain small and single domain for indefinite periods of time. The dispersion of the metal particles in the polymer provides a mobile medium of ferromagnetic material, useful in a large variety of applications.

The particles are usually prepared as stable colloidal suspensions. These suspensions will be stable for at least a day and usually more. The suspension will customarily be at least 65% (preferably 80%) by weight of solvent and for most uses will not be higher than 99%. The amount of polymer will depend upon the weight of metal. For a stable suspension, it is preferred to have a weight ratio of polymer to metal of from about 0.1 to 5. The necessary amount of polymer will vary with the composition and molecular weight. The weight of metal will usually vary from about 0.5 to 15% by weight of the composition. Preferred compositions will have 5 to 10% by weight, and more preferred 10 to 15% by weight.

In order to obtain stable suspensions, it is necessary that the solubility parameters of the polymer and the solvent be similar. A definition of solubility parameter is found in Tobolsky, Properties and Structures of Polymers, John Wiley & Sons, New York (1960), pages 64 ff. The solubility parameter is defined as the square root of the cohesive energy density. The cohesive energy density is defined as the molar energy of vaporization divided by the molar volume. While these properties are relatively easily determined for a solvent, they are difficultly determined for a polymer. Therefore, the solubility parameter for the polymer is not obtained directly. Rather, a slightly cross-linked polymer is prepared and a series of identical samples of the polymer is placed in a series of liquids of known solubility parameter. The extent of swelling caused by various solvents is plotted against the solubility parameter of the solvent. A bell-shaped curve is obtained and a maximum value is defined as the solubility parameter for the polymer. For particles of the size of this invention, it is preferred that the solubility parameter of the polymer differ by not more than 2.0 and preferably not more than 1.5 unit from the solubility parameter of the solvent.

Once the suspension has been prepared, the solvent may be exchanged. Usually the solvents will have a dielectric constant in the range of 1.7 to 20.

Compositions may also be obtained in which all of the solvent has been removed and only polymer and metal remain, the metal being dispersed in the polymer. The weight percent of the metal in the composition can be varied widely. Usually, the weight of the metal will be in the range of from 0.1 or 1 to 98%.

The novel chained metallic cobalt particles of from about 100 to 1,000 A. are obtained by the energetic decomposition of an organo-cobalt compound in the presence of an inert solvent and a polymer.

The decomposition is caused by introducing sufficient energy into the molecule to cause bond scission. This can be done mechanically, thermally or by electromagnetic radiation. When a particular compound permits, the thermal method of decomposition is preferred.

It is found that, during the course of the reaction, the reaction medium will become black and relatively opaque to ultraviolet light or other high energy (high as compared to thermal) types of radiation. Unless the reaction medium is kept as a thin film, the use of high energy radiation is very inefficient. Moreover, the system is inhomogeneous in that most of the reaction will occur in the area around the energy source. Because of these difficulties, the thermal method is preferred.

The organo-cobalt compound is one in which the metal is bonded to carbon, preferably coordinately bonded to carbon. In forming coordination compounds or complexes, orbitals of the metal atom are involved in bonding which are not ordinarily used in the simple metal compounds. In cobalt, the 3-d orbitals are involved.

The cobalt atoms can be bonded to a variety of compounds and radicals, e.g., arenes, cyclopentadiene, nitroso, etc.

A further preference is for those compounds in which the cobalt is coordinately bonded to carbonyl (carbon monoxide). In this group, the particularly preferred compounds are those in which cobalt is solely bonded to carbonyl, such as cobalt octacarbonyl and cobalt dodecacarbonyl.

It is also preferred that cobalt be in its zero or neutral valent state.

If desired, other metal compounds may be introduced in the reaction medium and decomposed along with the cobalt compound. In practice, other metal compounds are hard to find which respond to the reaction system in a manner similar to cobalt compounds. With those compounds which decompose more rapidly or more slowly, mixtures will usually be obtained. However, alloys can be achieved with other organo-metallic compounds which decompose at a rate similar to that of the cobalt compound, if the metal is able to fit in the cobalt crystal structure.

The solvent for the system must be relatively inert to the reactants and product and must be able to dissolve both the organo-metallic compounds and the polymer.

Groups which are chemically reactive to the reactants or products should generally be avoided. However, small amounts of reactive functional groups will find use in particular applications.

The preferred solvents are those of dielectric constant of about 1.7 to 6.0 and preferably 1.7 to 2.5 and 5.4 to 6.0: hydrocarbons, halohydrocarbons, and ethers. Aromatic hydrocarbon and halohydrocarbon solvents are preferred. Particularly preferred are aromatic solvents of dielectric constant in the range of about 2.1 to 2.5 and 5.4 to 6.0. Most of the solvents will be of up to and including 15 carbons and free of aliphatic unsaturation.

Among hydrocarbons are octane, cyclohexane, dodecane, decalin, benzene, xylene, toluene, cumene, mesitylene, tetralin, etc.

Among halohydrocarbons are fluorobenzene, chlorobenzene, bromobenzene, para-chlorotoluene, para-cholocumene, etc. While small amounts of aliphatic halides may be used, it is found that aliphatic halides having ionizable halogen are capable of reacting with the metal. Therefore, solvents having reactive halogens should be avoided.

Among ethers are dioxane, diethyl ether of ethylene glycol, anisole, diphenyl ether, etc.

It is necessary that the solvent be inert to both the reactant and the product. It is found that a number of compounds, particularly those compounds with active hydrogen, such as acidic hydroxyl groups and amino groups, will react with either the reactant or the product. Therefore, for the most part, large concentrations of compounds having active hydrogen should be avoided, particularly acids having acid dissociation constants greater than $10^{-11}$ ($K_a$ at 20° C. in water). In other words, non-hydroxylic solvents are preferred, and primary and secondary aliphatic amines should be avoided; also, formamides and N-alkyl formamides, since these compounds appear to be reactive.

The solvent, moreover, must not be so polar as to completely displace or desorb the polymer adsorbed as a surface film on the cobalt particles. It is often desirable, however, that the solvent be polar enough to partially desorb the polymer, so as to render the adsorbed film of polymer diffuse or tenuous, rather than compact and closely adhering to the surface.

It is found, however, that in many instances the product may be improved in coercive force, particle size and uniformity of size by having a co-solvent or additive present. With some polymers and solvents, additive can be necessary to obtain chaining. The amount of the co-solvent may vary from about 0.05% to about 40% by weight of the total solvent. The co-solvents are materials which have greater polarity (as indicated by dipole moment) than the major constituent of the solvent and usually have a heteroatom of Groups V to VI of the Periodic Table of atomic number up to and including 16: nitrogen, oxygen, phosphorus and sulfur, preferably oxygen.

The choice of additive will depend on: the polarity of the major component of the solvent; the polarity of the groups in the polymer; and the effect of the additive on the solubility of the polymer and the cobalt compound. The polarity of the additive should be greater than the polarity of the solvent. Both dielectric constant and dipole moment are functions of polarity. While the dipole moment is a preferred measure of polarity, there are limitations to its use which will be discussed subsequently. In most cases, however, it will suffice to say that the additive should have a greater dipole moment than the solvent.

Preferably, the additive should not be of significantly greater polarity than the most polar groups in the polymer. The more polar the additive as compared to the polarity of the polymer, the less the amount that should be used. Therefore, the preferred additive is of greater polarity than the solvent and of less polarity than the most polar groups in the polymer; the amount of additive should diminish as the polarity of the additive increases.

A further limitation on the choice of additive is its effect on the solubility of the cobalt compound and the polymer. The additive should not desolubilize the metal compound and the polymer. Moreover, as in the case of the solvent, the additive should be relatively inert to the reactant and product.

The additives which find use are alcohols, esters, ketones, amides, ethers (thio analogs of these groups, e.g., thiols, thioesters, thiones and thioethers), nitriles, sulfones, etc. These compounds include the common functional groups: carbonylic (oxo and non-oxo), oxy, sulfoxy, nitrile, etc. The additive will usually not exceed 20 carbon atoms and more generally not exceed 15 carbon atoms.

Illustrative of various compounds coming within the class are the following:

Among alcohols and thiols, benzyl alcohol, octanol, lauryl alcohol, 1,4-cyclohexanediol, octyl mercaptan, lauryl mercaptan, β-phenethylthiol, etc.

Among esters and thioesters, phenyl benzoate, octyl acetate, butyl butyrate, valerolactone, phenyl thioacetate, etc.

Among ketones and thiones, propiophenone, methyl furyl ketone, 2-octanone, cyclohexane-1,3-dione, thiobenzophenone, etc.

Among amides, N,N-diethylacetamide, N-phenylpyrrolidone, N-phenylbenzamide, etc.

Among ethers and thioethers, di-N-butyl ether, phenetole, 1,2-diethoxyethane, tetrahydrofuran, diethylsulfide, etc.

Among nitriles, toluonitrile, cyclohexylnitrile, heptylnitrile, etc.

Also included are various tertiary amines, aromatic amines, nitro compounds, phosphates, and other groups which contain the heteroatoms of Groups V to VI of the Periodic Table.

As already indicated, the amounts of the additives may range as high as 40% or higher by weight of the solvent. However, in most instances, the amount of additive will be 25% or less. With the exception of the ketones, the amount of additive will customarily be about 10%, preferably 5%, by weight of solvent or less and improved results can be obtained frequently with as little as 0.1%.

The additives will customarily have a dipole moment in the range of about 1 to 5.5 Debyes (D.) and preferably in the range of about 1 to 4.5 D., particularly preferred 1.5 to 3.0 D. With those additives having dipole moments greater than 3.0 D., with most polymers it is preferred to have less than 5% by weight of the total solvent.

Polymers must also be present in the reaction medium. The role of the polymer is not entirely understood. However, it is assumed that as the cobalt-organic compound begins to decompose, the resulting metal particles are preferentially surrounded by polymer. The polymer acts as a physical buffer between the particles. The metal particles are, therefore, prevented from forming large crystals by bonding together; rather, the particles grow by having atomic metal or a few atoms of metal deposited on the surface of the initially formed metal nuclei. In this way, the particles grow smoothly, form in a relatively uniform size and remain discrete and mobile.

In order that the polymer be preferentially adsorbed on the particle surface, it is necessary that the polymer be able to compete with the solvent for the surface. To this end, the polymer should have groups which are at least as polarizable (the ability to have a local dipole induced by an external charge) as the solvent and preferably more polarizable; or, which have a dipole moment at least as great as the solvent; or, which are capable of chemisorption to the metal surface to a degree as great or greater than the solvent. Parts of the polymer are adsorbed on the surface and strongly adhere; the remainder of the polymer forms an envelope around the particle acting as a physical buffer to prevent the aggregation of the metal.

The polymer should have at least 1 group per 400 atoms along the polymer chain of at least the dipole moment of the solvent and preferably of greater dipole moment. (The method of determining the dipole moment of a group in the polymer will be discussed subsequently.) With groups within 0.5 D. of the dipole moment of the solvent, it is preferred that there be at least 1 group per every 4 carbons along the chain, and particularly preferred that there be 1 group per every 2 carbons along the chain. Preferred polymers will have at least 1 group per every 300 atoms along the chain of at least 1 D. greater than the dipole moment of the major component of the solvent. Moreover, it is preferred that, per 10 atoms along the chain, there be not more than 1 group of a diode moment of 2 D. units greater than the solvents.

The polymer may be a homo- or a copolymer, generally having not more than 6 different monomers. However, there is no limit to the number of monomers that may be used, and in particular situations it may be advantageous to have a broad range of monomers in order to tailor the polymer to a unique application.

One or more polymers may be used. However, customarily only 1 polymer will be used.

The polymers which find use in the preparation of chains should have at least 1,000 molecular weight or higher. Preferred polymers are of at least 2,000 molecular weight and particularly preferred polymers are at least 10,000 molecular weight. The maximum molecular weight can be as high as solubility or gelation permits. It is preferred that the reaction medium not be gelled. Molecular weight can be as high as 10,000,000 or higher, but will generally not exceed 5,000,000.

The polymer may be hydrocarbon, but is preferably not totally hydrocarbon. Saturated aliphatic hydrocarbon polymers do not work. At least 0.1% by weight of other than saturated aliphatic hydrocarbon should be present in the polymer; the less polar the groups introduced, the more that will be required. The heteroatoms present will customarily be of Groups V to VII of the Periodic Table of atomic number less than 18. The elements are nitrogen, oxygen and fluorine of the 2nd Period and phosphorus, sulfur and chlorine of the 3rd Period. The Periodic Chart is the revised edition distributed by W. M. Welch Manufacturing Co., William F. Meggers (1956). The preferred elements are those of Groups V to VI of up to and including atomic number 17 and particularly preferred are those elements of up to and including atomic number 8.

As already indicated, the dipole moment is a significant characteristic of the polymer. An excellent discussion of dipole moment, referred to as electric dipole moment, is found in Ingold, Structure and Mechanism in Organic Chemistry, Cornell University Press, Ithaca, New York (1953), pages 99 ff. An extensive list of dipole moments can be found in Arnold Weissburger et al., Technique of Organic Chemistry, Volume VII, Organic Solvents, Interscience Publishers, Inc., New York, 1955, pages 275 ff.

Customarily, the polymer's dipole moment is measured as a whole. However, in this invention, the polarity of the polymer as a whole is not as significant as the polarity of a small space in the polymer. The space in the polymer may be considered an area, a group, a section, or any other term which will convey the notion of the existence of a dipole moment in a narrow portion of the polymer. In view of the interest in this invention in only a narrow portion of the polymer, the polarity of a functional group in the polymer will be determined in the following manner. The group will be considered as an entity from saturated aliphatic carbon to saturated aliphatic carbon. That is, the bond after the first aliphatic saturated carbon to other than hydrogen will be broken and replaced with a hydrogen. The dipole moment of the resulting compound may then be determined and used as an approximate measure of the dipole moment of a portion of the polymer.

To illustrate the method, consider the polymer polylauryl methacrylate. In this polymer there would be 1 carboxyl group every other carbon along the backbone. Breaking the bonds after the first saturated carbon on each side of the functional group, methyl acetate would be the analog. Methyl acetate has a dipole moment of about 1.75 D. There would, therefore, be one group having a dipole moment greater than 1 D. per 2 carbons along the chain. The polymer would have 12.6% of other than carbon and hydrogen. It would have an average dipole moment per atom of other than hydrogen of about 0.1 D./atom, and an average dipole moment per atom along the chain of 0.88 D./atom.

Another illustration is a polymer of a 1:1 ratio of phthalic acid and maleic acid, with diethylene glycol as the diol. Cleaving the bonds at the saturated carbon, the analogs would be dimethyl phthalate, dimethyl maleate, and dimethyl ether. Dimethyl phthalate has a dipole moment of about 2.4 D., dimethyl maleate of about 2.5 D., and dimethyl ether of about 1.1 D. A section of the chain of the following formula:

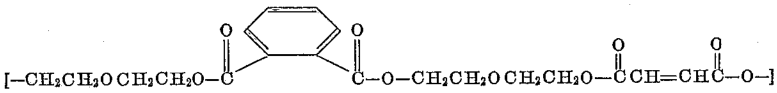

would be the average recurring unit. The number of atoms along the chain, counting the benzene ring as 6, would be 26. There would, therefore, be 4 groups of greater than 1 D. per 26 atoms along the chain. There would be 2 groups having dipole moments greater than 2 D. per 26 atoms and only 1 group of dipole moment of at least 2.5 D. per 26 atoms. The polymer would be 38% by weight of other than carbon and hydrogen; it would have an average dipole moment per atom in the polymer backbone of about 0.23 D./atom.

Another illustration is the polymer in which the heteroatom alternates with the carbon atoms. This is common to polymers which have aldehydes or imines as monomers. In these examples, the same saturated carbon will be considered as the methyl for 2 heteroatoms. (This is also true for vinylidene compounds, e.g., vinylidene chloride, vinylidene cyanide, etc.) Consider a typical polyaldehyde, polyformaldehyde, a section of the polymer would be:

$$—CH_2OCH_2OCH_2OCH_2OR$$

where R is an end group. There would be 3 groups having a dipole moment of about 1.1 D., i.e., the dipole moment of dimethyl ether, and 1 group per 2 atoms along the polymer chain. The other group would be an end group and would depend on the character of R. If R were hydrogen, then the group would be methanol having a dipole moment of 1.7 D. Ignoring the end groups, the polymer would have about 53% of oxygen and a dipole moment per atom other than hydrogen or per atom along the polymer backbone of about 0.5 D./atom.

Finally, a further illustration would be a copolymer of para-methyl styrene and acrylonitrile in a 75 to 25 ratio. According to our prior analysis, there would be 1 acetonitrile group per 8 atoms along the chain and 3 para-xylenes per 8 atoms along the chain. Acetonitrile has a dipole moment of 3.37. Para-xylene has a dipole moment of 0. According to the prior analysis, there would be an average dipole moment per atom other than hydrogen of about 0.12 D./atom, and 0.4 D./atom along the polymer backbone. However, the para-xylene will be treated differently, as will be explained subsequently. Counting para-xylene as two toluene groups, the polymer would have an average dipole moment per atom other than hydrogen of about 0.2 D./atom and about 0.7 D./atom along the chain.

One of the failings in the use of dipole moments to define the type of polymer is the problem of internal compensation. When a molecule permits symmetry, as in benzene, substituent functional groups which individually have high polarity, such as nitro or halo, can, when symmetrically disposed in the molecule, provide compounds with little or no overall dipole moment.

In some molecules, the internal compensation is small, e.g., dimethyl phthalate (2.3 D.) compared to dimethyl terephthalate (2.2 D.), although the dipole moment for the di-substituted compound is not much greater than the mono-substituted compound: methyl benzoate (1.9 D.). Estermann, Z. physik. Chem., ATB. B, 1 422–6 (1928). However, in a molecule such as para-dichlorobenzene or para-dinitrobenzene, the internal compensation is large. The dipole moment of ortho-dichlorobenzene is 2.33, while the dipole moment of para-dichlorobenzene is 0.23. Similarly, the dipole moment of ortho-dinitrobenzene is 5.98, while the dipole moment of para-dinitrobenzene is 0.58 D. Tignanik, Z. physik. Chem., ATB. B, 13 425–61 (1931). A comparison with the mono-substituted benzenes: chlorobenzene, 1.6 D.; nitrobenzene, 4.0 D., illustrates the great reduction in dipole moment because of internal compensation.

When calculating the average dipole moment, in those groups or compounds in which the dipole moment is less than the mono-substituted compound because of internal compensation, the group should be considered as 2 mono-substituted groups, rather than as 1.

In actuality, the problem of internal compensation will be rarely met and will even more rarely significantly affect the limitations defined for the polymers. Therefore, while such instances cannot be totally ignored, the problem is not a significant one.

The difficulty with dipole moment is that it is only a rough approximation of the ability of an atom or group to be adsorbed at a liquid-solid interface. This is in part an explanation of the failure of dipole in cases of internal compensation to explain the ability of various groups to be operable in this invention. As previously indicated, the significant criterion for the polymer is that it is able to interact with the surface of the metal particle. The bond between the polymer and the particle must be of sufficient strength to have the polymer adhere to the particle and act as a buffer. In those polymers in which the metal-polymer interaction is weak, the particle will be almost completely surrounded by solvent and will be able to bond with other particles.

Bonding of polymer segments to the particle can occur by either chemical or physical means. Thus, dipole-induced dipole interactions can lead to physical bonding while chemisorption can occur through interactions of pi ($\pi$) bonds or unbonded electron pairs, e.g., unsaturated carbon, oxygen and nitrogen atoms. However, while the dipole moment is only a rough indication of the capability of a polymer to interact with the metal particles, in most cases it will suffice.

The polymers will usually have at least 0.1% by weight of other than carbon and hydrogen and preferably not more than 45%. Preferred polymers usually have from about 1 to 40% by weight of other than carbon and hydrogen. Customarily, the non-hydrocarbon portion will be those heteroatoms indicated previously.

Another criterion of effectiveness for the polymer is the average dipole moment per atom. This is obtained by adding the total contribution of all the groups present in the polymer and dividing by the number of atoms. Most polymers will have average dipole moments per atom other than hydrogen in the range of about 0.02 to 1.0 D./atom; preferred polymers in the range of about 0.05 to 0.8 D./atom, more preferably 0.10 to 0.6 D./atom.

Almost all the polymers will have an average dipole moment per atom along the polymer backbone in the range of about 0.1 to 1.8 D./atom, preferably 0.4 to 1.2 D./atom. This value is distinguished from the previous value—the average dipole moment per atom in the polymer—in that it more closely reflects the spacing of the polar groups along the polymer backbone. The dipole moment of any individual group will rarely exceed 5.0 D. and even more rarely exceed 5.5 D. Usually, the most polar group in the polymer will be a urea or a thiourea. The least polar group is exemplified by ethane or other aliphatic hydrocarbons.

In many polymers, it is found that a small percentage of hydroxyl groups, particularly alcoholic hydroxyl, enhances the growth of the particles. Usually, it is beneficial to have about 0.5 to 7.5%, preferably 5%, by number of functional groups in the polymer having hydroxyl groups.

Various hydrocarbon radicals are present in the monomers. They appear as groups in esters, as substituents on nitrogen, as groups on benzene rings, etc. They will usually be less than 20 carbons and preferably less than 16 carbons. They include alkyl, aralkyl, alkaryl, etc. The hydrocarbon substituents, in turn, may be substituted by heteroatoms. For example, 2-methoxyethyl acrylate has both an ether function and an ester function. In this way, a single monomer may have two or more functional groups.

When discussing types of polymers, it is intended that at least 50% by weight of the polymer is composed of the particular types of monomer.

One class of polymers is addition polymers. These polymers for the most part are formed by the linking together of groups having aliphatic unsaturation. For the most part, the addition polymerizable monomers have the formula $$CH_2{=}C\begin{matrix}\diagup A\\ \diagdown B\end{matrix}$$

where A and B can be hydrogen, alkyl, cycloalkyl, aryl, alkaryl and various groups which have electrons uninvolved in sigma bonding. The groups will be discussed subsequently as functional groups.

A few monomers which can be addition polymerized have the formula:

$$\begin{matrix}A'\diagdown\\ B'\diagup\end{matrix}C{=}C\begin{matrix}\diagup A\\ \diagdown B\end{matrix}$$

A′ and B′ are defined in the same manner as A and B which have been defined previously. Rarely will there be more than 2 functional groups present. In most instances, the monomers will not be capable of homopolymerization but can be successfully copolymerized. Various examples of these monomers will appear in the subsequent discussion.

Generally, the addition polymers will be of at least 5,000 molecular weight, preferably 10,000. The addition polymers should be at least as polar as a polystyrene polymer and preferably not more polar than polyacrylonitrile. The preferred addition polymers have from about 85%, preferably 95%, of the functional groups of dipole moment of from 1 to 2 D., such as hexyl methacrylate, lauryl acrylate, vinyl chloride, vinyl butyrate, etc. Particularly preferred are those polymers which are composed predominantly of groups having dipole moments of 1 to 2 D., but in addition have from 0.2 to 10%, preferably to 5%, by number of groups having dipole moments greater than 2.5 D.

A large number of addition polymers are hydrocarbons, i.e., those where A and B are hydrogen, aliphatic hydrocarbon or aromatic hydrocarbon. For hydrocarbon polymers which are not modified with heteroatoms, at least one of A and B must be aromatic. The aromatic addition polymers will usually be styrene or substituted styrenes, e.g., meta-methylstyrene, α-vinylnaphthalene, 2,4-dimethyl-1-vinylbenzene, α-methylstyrene, etc.

Among the aromatic hydrocarbon polymers, it is preferred to have 1 monomer per 500 monomers and particularly preferred to have 1 monomer per 300 monomers having a group having a dipole moment of greater than 1 D. In particular applications, it is frequently preferred to have at least 0.2% of the number of monomers having a group having a dipole moment greater than 1 D. and, in some instances, 10% of the groups having dipole moments of greater than 1 D. Usually, the fewer the polar groups the higher the molecular weight that is preferred. With polystyrene polymers, it is preferred to have a molecular weight of at least about 20,000.

The hydrocarbon polymers, including both the aliphatic and the aromatic, may be modified with polar groups to introduce polarity into the polymer. The hydrocarbons may be modified in various ways, such as sulfonation, halogenation, nitration, oxygenation, etc. Groups introduced include sulfonic esters, sulfonamides, chlorine, bromine, nitro, hydroxy, etc. In these polymers, it is preferred to have about 0.1 to 40% by weight of other than hydrocarbon.

The non-hydrocarbon addition polymers will have 60 to 100% by number of monomers containing heteroatoms, particularly preferred 75 to 100%. Among the common functional groups which are found in addition polymerizable olefins are: halogen, ether, thioether, carbonylic: non-oxo-carbonyl—ester, amide, carboxylic acid, carboxylic anhydride, carbamate; oxo-carbonyl—ketone, aldehyde; alcohol, thiol, amines, nitriles, nitro, inorganic acid derivatives—sulfones, sulfonamides, phosphates, phosphonates, phosphonamides, thiophosphates—etc. A and B of the previously indicated formula may be any of these groups as well as a hydrocarbon, with the proviso that at least 1 of A and B must be a functional group other than hydrocarbon. A and B will range from 0 to 20 carbons each and will preferably be not more than 16 carbons. The monomer will preferably be not more than 20 carbons.

Various groups of monomers find general use. Among these various groups are the following:

Acrylics, e.g., methacrylic acid, α-chloroacrylic acid, methyl α-chloroacrylate, β-chloroethyl α-chloroacrylate, methyl α-ethyl acrylate, amyl acrylate, hexadecyl acrylate, 2-tetrahydrofurfuryl methacrylate, cyclohexyl methacrylate, methacrylamide, N,N-dimethylaminoethyl methacrylate, 2-fluoropropyl methacrylate, 2-ethoxyethyl acrylate, etc. Also included in this category should be derivatives of maleic acid and fumaric acid, such as maleic anhydride, ethyl maleate, butyl fumarate, maleimide, etc.;

Vinyl and allyl alcohols, ethers and esters, e.g., vinyl alcohol, vinyl acetate, vinyl ethyl carbonate, vinyl butyl ether, vinyl phenyl ether, vinyl benzylacetate, vinylcarbinol, vinyl benzoate, vinyl ethyl ether, vinyl polyethylene glycol, vinyl isopropyl ether, vinyl methyl sulfide, vinylmercaptan, vinyl naphthoate, vinyl stearate, vinyl phenyl thioether, vinylene carbonate, isopropenyl acetate, isopropenyl phenyl ether, allyl stearate, etc.;

Vinyl halides including the haloprenes, e.g., vinyl fluoride, vinyl chloride, vinylidene chloride, fluoroprene, chloroprene, etc. The monohalo vinyl halides are preferred. The halides that are preferred are those of atomic number of not more than 35, and preferably not more than 17. It is found with vinylidene halides the gem.dihalide is reactive to the finely divided cobalt. In the presence of a polymer containing large amounts of gem.dihalide, much of the cobalt may be consumed in the reaction. To the degree that the gem.dihalides are reactive with the metals, they should be avoided;

Vinyl amines and amides, e.g., vinyl pyrrolidone, N,N-dimethyl vinyl amine, vinyl glutarimide, vinyl N-phenyl acetamide, vinyl N-caprolactam, vinyl diphenylamine, etc. As already indicated, homopolymers of amines should generally be avoided, but the monomers can be used in copolymers;

Vinyl cyanides, e.g., acrylonitrile, α-chloroacrylonitrile, vinylidene cyanide, maleinitrile, etc.;

Vinyl derivatives of inorganic acids, e.g., dimethyl vinyl phosphate, vinyl phenyl sulfone, vinyl butylsulfonate, dimethyl ethylenephosphonate, etc.;

Vinyl heterocycles, e.g., N-vinylpyrrole, N-vinylindole, N-vinylcarbazole, vinylpyridine, vinylquinoline, vinylfuran, vinylthiophene, vinylbenzofuran, etc.;

Hetero-substituted styrenes, e.g., para-cyanostyrene, para-nitrostyrene, para-chlorostyrene, meta-carbethoxystyrene, α-chlorostyrene, etc. In this category the functional groups are generally bonded to the aromatic ring.

As already indicated, the groups that are attached to functional groups, such as in esters or in the nitrogen of the amide, may be further substituted by other functional groups. In this way, relatively small areas within the polymer may have a high number of polar groups. In this invention, the polar groups will be counted whether they are directly bonded to the polymer backbone or appear on a side chain. However, it is preferred that for the most part the polar groups be directly bonded to the polymer backbone. In particular situations, it may be preferable to include groups bonded to the side chain.

Another class of polymers which finds use in this invention is condensation polymers. These polymers differ from addition polymers in that, during the polymerization reaction, simple molecules, such as water, alcohol, hydrazide or salts are eliminated. While there are exceptions to this statement, such as polymers of epoxides and aldehydes, for the most part the statement is true. Another way of distinguishing condensation polymers from addition polymers is that, in condensation polymerization, usually sigma bonds are broken and new sigma bonds formed, while in addition polymers pi bonds between carbons are broken and sigma bonds are formed.

The condensation polymers will usually have a molecular weight in the range of about 1,000 to 1,000,000 and more generally in the range of about 2,000 to 750,000. Preferred polymers are in the range of about 1,000 to 100,000. Also preferred are those polymers that do not have more than 1 group per 10 atoms along the polymer chain having a dipole moment greater than 2.5 D. Particularly preferred are polymers having not more than 1 group per 25 atoms along the polymer chain of greater than 2.5 D.

The polymer should be flexible, rather than rigid. Rigidity is caused by numerous groups having aliphatic or aromatic unsaturation placed closely together in the polymer backbone or by hydrogen bonded structures, such as the alpha-helix of polybenzyl glutamate.

Condensation polymers have a physical difference from addition polymers that is significant in this invention. In addition polymers, there is always a long chain of aliphatic hydrocarbon. Pendent from the chain are polar or polarizable groups. Therefore, the polymer can arrange itself in solution to have the non-polar portion outwardly directed toward the relatively non-polar solvent, and the polar groups directed inwardly toward the metal particle. The situation of having polar groups directed toward the particle and adhering to the particle surface and the less polar or non-polar groups residing free in the solvent and being intermixed with the solvent is an ideal situation. It permits strong bonding to the surface of the particle and a hydrocarbon envelope acting as a physical buffer. However, in condensation polymers, it is rare that the polar groups are not part of the polymer chain. One condensation polymer which does have its functional groups pendent from the polymer chain is a phenal-formaldehyde polymer. This polymer also can have its polar groups inwardly directed toward the particle and its relatively non-polar groups outwardly directed toward the solvent.

In most condensation polymers, however, the chain itself will have the polar groups. Unless the polar groups are spaced rather far apart, the polymer will be tightly bound and flattened to the surface of the particle. However, in those polymers which are modified with groups having aliphatic hydrocarbon, the polar portion of the molecule can be adsorbed on the surface while the relatively non-polar portion is free to be solvated by the solvent and form a buffer around the particle.

In order for condensation polymers to be operative, they should either have a large amount of relatively non-polar material between the functional groups or have pendent from the condensation polymer large groups of relatively low polarity. Of course when considering polarity of the various groups, the base point must always be the polarity of the solvent.

The same functional groups appear in both the condensation and addition polymers. They have been previously listed in the discussion of the addition polymers.

The monomers used in condensation polymers may have 1 or more functional groups. The preferred monomers are those which have from 1 to 2 functional groups. While cross-linking is permissible, usually cross-linking will reduce the solubility of the polymer in common solvents. To that extent, those polymers having little or no cross-linking are preferred.

One group of monomers includes epoxides, aziranes and polyols, particularly glycols. Illustrative monomers are oxirane, aziranes, propylene oxides, isobutylene oxide, styrene oxide, 2,2-dimethyl azirane, ethylene glycol, tetramethylene glycol, glycidyl methyl ether, glycidyl chloride, glycidyl benzoate, diglycidyl ether, etc.

It is found that, with the non-copolymerized polyalkylene oxide polyols and their analogs, chains are not obtained. However, the polyoxyalkylene polyols may be used as monomers in polyurethanes or polyesters or to modify addition polymers.

Another group of monomers includes those having non-oxo-carbonyl groups in which the carbonyl is bonded to 1 carbon atom. These compounds when polymerized are usually polyesters, polyamides and, in a few specific cases, polyanhydrides. Illustrative acid monomers are maleic acid, fumaric acid, phthalic acid, isophthalic acid, terephthalic acid, succinic acid, sebaic acid, itaconic acid, etc. Usually, the acids will be from 2 to about 15 carbons. Among alcohols which find use are butanediol, diethylene glycol, polyethylene glycols, usually of up to and including 500 molecular weight, resorcinol, hydroquinone, 1,2-cyclohexan-diol, glycerol, etc. The polyols (except for the polyalkylene glycols) will be usually of from 2 to 15 carbons and preferably will have not more than 3 hydroxyl groups, glycols being particularly preferred. Among polyamines are hexamethylene diamine, phenylene diamine, tetramethylene diamine, decamethylene diamine, ethylene diamine, etc. Also included in this class are lactams and lactones, such as caprolactam, butyrolactone, dimethyl butyrolactone, valerolactam, etc. Also included in this class are amino acids and hydroxy acids, e.g., ω-aminovaleric acid, 4-aminocyclohexane, carboxylic acid, 2-hydroxycyclopentylcarboxylic acid, ω-hydroxypelargonic acid, polyethylene glycolacetic acid, etc.

Alkyd resins (polyesters) are a particluary useful type of condensation polymer. The polyesters may be prepared having free alcoholic groups which may then be esterified with long chain fatty acids. Such fatty acids include dehydrated castor oil, soybean oil, linolenic acid, linoleic acid, stearic acid, palmitic acid, etc. Moreover, the alkyd resins can be made using dibasic acids containing aliphatic unsaturation, e.g., maleic acid, fumaric acid, itaconic acid, etc. These alkyd resins, as well as alkyd resins containing unsaturated fatty acids, can then be modified with addition polymerizable monomers, e.g., styrene, methyl methacrylate, ethyl acrylate, etc. Relatively low molecular weight alkyd resins find use in this invention. Preferably, the molecular weight will be at least 1,500 and preferably 2,000. Moreover, it is preferred that at least 35% by weight of the polymer is fatty acid or addition polymerizable monomer.

The acid number of the polymer should be kept low, preferably less than 15, and particularly preferred, less than 10.

Another group of monomers includes those having a non-oxo-carbonyl which is not bonded to carbon. These include ureas, thioureas, carbamates, carbonates, etc., and their thio analogs. The carbonyl containing monomer groups will have such functionalities as thiocyanate, isothiocyanate, carbonyl (e.g., phosgene) or isocyanate, etc., and be polymerized with polyols or polyamines.

Another group of monomers includes those based on oxo-carbonyl groups, e.g., aldehydes, which includes polyaldehydes, phenol-aldehyde copolymers and urea-aldehyde copolymers. These polymers are well known in the art and do not require elaboration. For the most part, it is preferred that these polymers be copolymerized with other groups or polymers in order to impart flexibility and provide areas of differing polarity.

The condensation polymers may be a combination of the various monomers. Isocyanates and carboxylic acids may be condensed together with polyols, polyepoxides may be introduced into various other condensation polymers, phenol-aldehyde polymers may be modified with glycidyl ether and then further modified with polyepoxides, etc. Moreover, condensation polymers may be joined with addition polymers. For example, a condensation polymer containing maleic acid may be modified with styrene. A polyacrylate may be modified with a polyepoxide. Moreover, alkyd resins may be modified with long-chain fatty acids, in effect, introducing a short-chain polyethylene. As in the prior polymers, also in the combination polymers, it is preferred that 85%, preferably 95% of the groups have a dipole moment of from 1 to 2 D.

The condensation polymer must have some portion of the molecule desorbed from the surface and be solvated in the solvent. This can be achieved with polymers having groups of relatively high polarity alternating with groups of relatively low polarity, e.g., hydrocarbon, halohydrocarbon and ether. The groups of relatively low polarity must be large or numerous as compared to the groups of relatively high polarity. Alternatively, the condensation polymer can have pendent groups, such as occurs in alkyd resins. These groups should be of at least 10 carbons and preferably higher.

A large number of condensation polymers are of low molecular weight or rigid or insoluble in solvents of low dielectric constant. The condensation polymers are, therefore, limited to those which are flexible, have large areas of low dipole moment, as compared to the areas of high dipole moment, and are soluble in solvents of low dielectric constant.

It is found in some instances that the polymer-encapsulated particles will agglomerate. This is particularly true, when the colloidal suspension originally obtained is allowed to stand for long periods of time. The agglomeration also occurs with low molecular weight polymers or those at the periphery of the limitations. However, in most cases, the agglomeration can be redispersed by removing the solvent and vigorously agitating the agglomerate with a more polar solvent.

The temperature used in the preparation of the cobalt particles will depend on the method of decomposition, the organo-cobalt compound and the particular solvent and polymer used. It is found that both polymer and solvent have an effect on the rate of decomposition. Usually, the temperature will be in the range of about −50° C. to about 250° C. Relatively low temperatures may be used when methods other than heat are used for the decomposition. In the thermal decomposition of cobalt carbonyl, temperatures will usually be in the range of about 50° to 200° C., preferably in the range of about 85° to 175° C., and particularly preferred in the range of about 100° to 150° C.

The pressure for the system will generally be autogeneous. However, higher pressures may be useful, particularly when using low boiling solvents. Pressures will usually not be above 250 p.s.i. However, the pressure is not critical and will have only an insignificant effect on the process, as long as the pressure of carbon monoxide is below the decomposition pressure of the cobalt carbonyl compound, when carbonyl compounds are used.

The concentration of the metal compound in grams per 100 ml. of solvent will generally be at least 0.5 and preferably higher. Individual polymers require a minimum of metal-compound concentration for chaining. As the amount of organo-cobalt compound per unit volume is increased, the particle size also increases. Ultimately, the particles are of sufficient size to form chains. That is, at least 35% by weight, preferably 65%, of the particles are above 100 A., and preferably above 150 A., and start to chain.

Usually, with cobalt carbonyl, at least 0.8 gram per 100 ml. of solvent will be used. Higher amounts will generally be required. Generally, the weight of cobalt-organic compound to 100 ml. of solvent will range between about 1 to 35 grams and preferably 1.5 to 25 grams per 100 ml. The weight of metal per 100 ml. in the suspension should be at least about 0.2 gram and preferably at least about 0.5 gram. Usually, it will not exceed 20 grams, and more usually not exceed 15 grams.

The polymer-metal ratio may be varied, but a minimum ratio is required. The polymer-metal weight ratio will usually be in the range of about 0.05 to 15 and preferably in the range of about 0.1 to 10. Particularly preferred is a polymer-metal ratio of 0.1 to 2. With highly polar polymers, ratios in the lower portion of the range are preferred, since an increasing number of highly polar groups tends to reduce the size of the particles.

The effect of the polymer is sensitive to its composition and no broad generalization concerning polymer to metal ratio can be made. The concentration of the polymer will be determined by the concentration of the metal compound and the ratio of polymer to metal desired. It is generally preferred that the concentration of polymer be not less than 0.01 gram per 100 ml. of solvent. Customarily, the range of concentration will be from about 0.05 gram to about 25 grams per 100 ml. The maximum concentration will be sensitive to the solubility of the polymer in the solvent as well as any gelation that might occur.

The method of addition may be either batchwise or by incremental addition. All the components may be put together in a flask and brought to the desired temperature. Alternatively, the polymer and solvent may be mixed together and the organo-metallic compound added as a solid or in a suitable solvent.

The time for the addition will vary according to the compound being used, the temperature at which the reaction is run, and the method of decomposition. Usually, the time may vary from 1 or 2 minutes to 60 hours or more. Preferably, the time will range from about 5 minutes to about 48 hours. The time is not critical and will be determined by the end of the carbon monoxide evolution. Running the reaction to completion is not essential, but is expedient. When discussing concentrations, it is intended that the reactions have been run to completion.

It is preferred to carry out the reactions in the absence of oxygen. However, small amounts of oxygen may be present. Gases, such as nitrogen, helium, argon, etc., may be used to provide an inert atmosphere for the process.

As previously indicated, the product is usually a stable colloidal suspension. Sometimes, however, the mixture is thixotropic and occasionally, with some polymers and at some metal concentrations, sedimentation occurs. For most uses, it is not necessary to have a stable suspension. Thixotropic mixtures will flow with stirring. Even the products that sediment, usually are sufficiently fluid to be spread.

The reaction is conveniently run by introducing the desired solvent, the metal organic compound and the polymer into a reaction vessel. The vessel is fitted with stirring and condensing means and is swept free of oxygen with nitrogen. When the method of decomposition is thermal, the system can be conveniently heated by a variety of means. The temperature may be controlled by being the reflux temperature of the solvent. With cobalt carbonyl compounds, the mixture is then refluxed until the theoretical amount of carbon monoxide has been evolved and often for a shirt period longer.

It has been found with the decomposition of carbonyl compounds that it is preferable to have a refluxing solvent. In this way, the carbon monoxide is rapidly removed from the reaction medium. Moreover, it is preferable to have a rather rapid rate of reflux, rather than just a mild reflux.

The product is then cooled and is usually examined either for its magnetic properties in a B–H meter or its appearance in an electron microscope or both. Most frequently the original product appears as a black suspension.

In taking the electron micrographs, a 1 ml. sample was diluted to a total of 10 ml., shaken and 1 drop smeared on an electron microscope sample grid (Formvar Substrate-Ladd Research Industries). After drying, electron photomicrographs of the sample were taken using a J.E.M. Model 6A electron microscope. Usually 40,000 magnification was used, and the photograph enlarged 4 times.

When determining the magnetic properties of the cobalt particle composition, the sample was stirred in a high shear blender for about 1 minute. The mixture was then coated on 1 mil Mylar (Du Pont terephthalate polyester) with a paint applicator. The applicator gate was set to give a dry coating 0.1 to 0.2 mil thick. The coating was dried mostly by evaporation; the final drying was accomplished using an infrared lamp.

Magnetic properties of the particles were measured with a B–H meter (Scientific Atlanta Inc., Model 651B). When referring to "B" (flux density), what is intended is B–H or $4\pi I$, where I is the intensity of magnetization and H is the strength of the applied field. Therefore, values are reported as intrinsic coercive force, namely the reverse field necessary to bring the quantity B–H back to zero.

The following examples are by way of illustration and not limitation.

*Example I*

Into a flask fitted with a stirrer and reflux condenser was introduced 20 grams of cobalt carbonyl, 3.4 grams of a methyl methacrylate:ethyl acrylate:vinyl pyrrolidone (37:69:1) polymer, 25 ml. of methyl isobutyl ketone, and the volume brought up to 250 ml. with toluene. The flask was swept with nitrogen and then heated to reflux. When the theoretical amount of carbon monoxide had evolved, the heat was maintained for a short period longer and the flask removed from the heating bath. The black dispersion was inspected in an electron microscope and in a B–H meter. FIG. 1 shows an unoriented sample at 160,000 magnification and the hysteresis loops of the oriented and unoriented sample. The product had a coercive force of 540 oersteds (oe.).[1]

*Example II*

Figure 2:
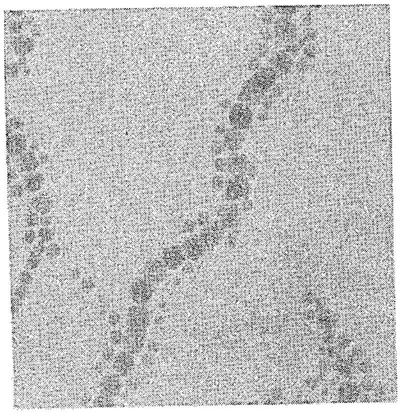

In an apparatus as described in Example I was introduced 21.2 grams of cobalt carbonyl, 2.3 grams of a methyl methacrylate:ethyl acrylate:vinyl pyrrolidone (33:66:1) polymer and 212 grams of chlorobenzene. The reaction flask was heated to reflux and the heat maintained until the theoretical amount of carbon monoxide had evolved. The product was a black dispersion. FIG. 2 shows an electron photomicrograph at 160,000 magnification. The coercive force was 276 and the remanence ratio 0.54.

*Example III*

Figure 3:
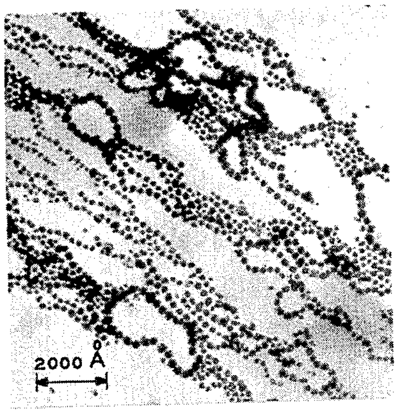
Figure 4:

The reaction was carried out as described in Example I. The materials used were 40 grams of cobalt carbonyl, 6 grams of methyl methacrylate:butyl methacrylate:vinyl pyrrolidone (56:56:1) and 2,000 ml. of toluene. The mixture was refluxed for 6 hours. FIG. 3 shows an electron micrograph at 75,000 magnification of the product oriented in a 3,000 oe. field. The material had a coercivity of 560 oe.

Table I is a recapitulation of the previous 3 experiments in tabular form as well as a number of additional experiments, all of which have electron photomicrographs as figures. Table II is a number of experiments carried out under varying conditions using predominantly polyester addition polymers, e.g., acrylates and vinyl esters. Both homopolymers and copolymers are illustrated as well as polymers which have been modified with hydroxyl and amide groups. Table III is concerned with addition polymers, primarily chloroprene, polystyrene and polychlorinated polysulfonamido polyethylene. The polystyrenes are modified with acrylate and acrylonitrile. Table IV is concerned with condensation polymers. These include polyalkylene polyols, copolymerized with urethanes and polyesters, as well as an alkyd resin.

[1] Unless otherwise indicated, the field used to measure the coercive force is 1,000 oe.

TABLE I

| Polymer[1] | Polymer | | $Co_2(CO)_8$, gms. | Solvent[2] | Ml. | Additive[3] | Ml. | $H_{ic}$ | | Br/Bs | | Figure* |
|---|---|---|---|---|---|---|---|---|---|---|---|---|
| | Gms. | Approx. M.W. | | | | | | 1,000 oe. | 2,000 oe. | 1,000 oe. | 2,000 oe. | |
| MMA(37)EA(69)VP(1) | 3.0 | $3\times10^5$ | 25 | T | 215 | MIBK | 25 | 540 | ------- | 0.62 | ------- | 1 |
| MMA(33)EA(66)VP(1) | 2.3 | $1\times10^5$ | 21.2 | CB | 212 | ------- | ------- | 276 | 307 | 0.54 | 0.54 | 2 |
| MMA(56)BMA(56)VP(1) | 6 | $2\times10^5$ | 40 | T | 2,000 | ------- | ------- | 360 | ------- | 0.5 | ------- | †3 |
| N-AD | 2.7 | $4\times10^5$ | 23.5 | CB | 237 | ------- | ------- | 469 | 596 | 0.49 | 0.53 | 4 |
| AX | 2.7 | $2\times10^3$ | 23.5 | T | 168 | ------- | ------- | 156 | 173 | 0.41 | 0.42 | 5 |
| N-AC | 2.3 | $4\times10^5$ | 21.2 | T | 170 | ------- | ------- | 508 | 788 | .49 | 0.62 | 6 |
| MMA(10)VP(1) | 0.8 | $1\times10^4$ | 11.2 | CB | 112 | ------- | ------- | 151 | 165 | 0.51 | 0.51 | 7 |
| N-AD‡ | 2.7 | $4\times10^5$ | 23.5 | T | 220 | ------- | ------- | 354 | 408 | 0.57 | 0.57 | 8 |
| S(300)HEMA(1) | 2.7 | $7\times10^4$ | 23.5 | ------- | 235 | ------- | ------- | ------- | 584 | ------- | 0.50 | 9 |

See Table IV for footnotes 1, 2, and 3.

*With the exception of FIG. 3, which is 75,000 magnification, the figures are at 160,000 magnification.

†Sample oriented in a 3,000 oe. field.

‡The polymer composition had the following components:

N-AD—68.4 percent by weight.
Bakelite 1282-MgO compound—30.7
phenyl alpha-napthylamine—0.16
MgO—0.33
ZnO—0.41

This is a standard mixture for gelling the polymer.

Bakelite 1282 is a phenol-formaldehyde ploymer with the para-position blocked to prevent cross-linking.

TABLE II

| Polymer [1] | Polymer Gms. | Polymer Approx. M.W. | $Co_2(CO)_8$, gms. | Solvent [2] | Ml. | Additive [3] | Ml. | $H_{io}$ 1,000 oe. | $H_{io}$ 2,000 oe. | Br/Bs 1,000 oe. | Br/Bs 2,000 oe. | G./ml.[4] | Rate of add'n, ml./min. |
|---|---|---|---|---|---|---|---|---|---|---|---|---|---|
| VA(99)VP(1) | 2.7 | 1×10⁵ | 23.5 | T | 200 | MIBK | 5 | 211 | 272 | .38 | .42 | | |
| EA(93)VP(1) | 2.7 | 1×10⁵ | 23.5 | T | 200 | SBA | 5 | 438 | 458 | .62 | .59 | | |
| VA(99)VP(1) | 2.7 | 1×10⁵ | 23.5 | T | 200 | MIBK | 5 | 313 | 358 | .50 | .51 | | |
| EA(186)VP(1) | 2.7 | 9×10⁵ | 23.5 | T | 200 | MIBK | 5 | 335 | 350 | .53 | .48 | | |
| EA(79)VP(1) | 2.7 | 5×10⁵ | 23.5 | T | 200 | MIBK | 10 | 438 | 461 | .65 | .59 | | |
| EA(79)VP(1) | 2.1 | 5×10⁵ | 23.5 | T | 200 | MIBK | 5 | 401 | 416 | .64 | .59 | | |
| EA(79)VP(1) | 1.0 | 5×10⁵ | 23.5 | T | 200 | MIBK | 5 | 423 | 431 | .60 | .56 | | |
| EA(93)VP(1) | 2.7 | 1×10⁵ | 23.5 | T | 200 | MIBK | 10 | 411 | 438 | .63 | .61 | | |
| EA(79)VP(1) | 0.8 | 5×10⁵ | 23.5 | T | 200 | MIBK | 5 | 325 | 338 | .62 | .57 | | |
| EA(65)MMA(35) | 1.5 | 2×10⁵ | 10 | X | 500 | | | 420 | | .47 | | 10/200T | 10 |
| MMA(39)EA(73)HPMA(1) | 3 | 2×10⁵ | 20 | T | 250 | | | 525 | | .47 | | | |
| MMA(39)EA(72)VP(1) | 5.6 | 1×10⁵ | 3.3 | T | 180 | | | 359 | | .61 | | | |
| MMA(35)EA(70)HEMA(1) | 1.6 | 1×10⁵ | 3.3 | T | 100 | | | 500 | | .55 | | | |
| MMA(37)EA(69)MP(1) | 1.5 | 1×10⁵ | 39 | T | 500 | | | 540 | | .51 | | 39/200T | 2.5 |
| MMA(39)EA(73)HPMA(1) | 1.5 | 2×10⁵ | 10 | T | 250 | | | 450 | | .44 | | 20/95T | 1.5 |
| MMA(39)EA(72) | 2.2 | 2×10⁵ | 15 | T | 250 | | | 520 | | .49 | | 20/95T | 1.5 |
| MMA(56)BMA(56)VP(1) | 1 | 2×10⁵ | 24 | T | 300 | | | 670 | | .44 | | | |
| MMA(56)BMA(56)VP(1) | 0.5 | 2×10⁵ | 12 | T | 300 | | | 600 | | .4 | | | |
| HMA(111)VP(1) | 1.5 | 8×10⁴ | 12 | T | 500 | | | 600 | | .5 | | | |
| MMA | 7 | 1×10⁵ | 5.4 | X | 125 | | | 550 | | .58 | | | |
| EA(111)VP(1) | 2 | 1×10⁴ | 6 | T | 400 | | | 425 | | .37 | | | |
| EA(100)VP(1) | 2.8 | 1×10⁴ | 24 | T | 200 | MIBK | 15 | 300 | | .4 | | | |
| MMA(10)VP(1) | 2.8 | 1×10⁵ | 24 | T | 200 | MIBK | 100 | 216 | 235 | .42 | .39 | | |
| MMA(10)VP(1) | 2.8 | 1×10⁵ | 24 | D | 200 | | | 217 | 359 | .31 | .36 | | |
| MMA(39)EA(72)VP(1) | 2.8 | 3×10⁵ | 24 | T | 200 | MIBK | 15 | 558 | 586 | .65 | .62 | | |
| MMA(33)EA(66)VP(1) | 2.3 | 1×10⁵ | 20.1 | T | 200 | BS | 4.3 | 473 | 516 | .66 | .66 | | |
| MMA(33)EA(66)VP(1) | 2.3 | 1×10⁵ | 20.1 | T | 200 | BS | 2.2 | 411 | 461 | .60 | .58 | | |
| MMA(33)EA(66)VP(1) | 2.1 | 1×10⁵ | 18.4 | T | 200 | MP | 1.8 | 100 | 143 | | .06 | | |
| MMA(33)EA(66)VP(1) | 1.3 | 1×10⁵ | 11 | T | 110 | MIBK | 1.9 | 385 | 423 | .60 | .60 | | |
| MMA(33)EA(66)VP(1) | 2.4 | 1×10⁵ | 21.2 | CB | 212 | | | 276 | 307 | .54 | .54 | | |
| HMA(300)HEMA)(1) | 2.7 | 1×10⁵ | 23.5 | T | 250 | | | | 740 | | .62 | | |
| MMA(33)EA(66)VP(1) | 2.7 | | 23.2 | T | 200 | | 2.5 | 120 | | .13 | | | |

See Table IV for footnotes 1, 2, 3, and 4.

TABLE III

| Polymer [1] | Polymer Gms. | Polymer Approx. M.W. | $Co_2(CO)_8$, gms. | Solvent [2] | Ml. | Additive [3] | Ml. | $H_{io}$ 1,000 oe. | $H_{io}$ 2,000 oe. | Br/Bs 1,000 oe. | Br/Bs 2,000 oe. | G./ml.[4] | Rate of add'n, ml./min. |
|---|---|---|---|---|---|---|---|---|---|---|---|---|---|
| N-AD | 2.3 | 4×10⁵ | 21.7 | T | 200 | | | 554 | 638 | .62 | .57 | | |
| N-AC | 2.3 | 4×10⁵ | 21.7 | T | 200 | | | 358 | 423 | .40 | .35 | | |
| N-AC | 3.7 | 4×10⁵ | 70 | T | 600 | | | 454 | 523 | .48 | .45 | | |
| N-AD | 7.0 | 4×10⁵ | 70 | T | 600 | | | 508 | 696 | .49 | .59 | | |
| N-AC | 2.3 | 4×10⁵ | 23.5 | T | 200 | | | 508 | 788 | .49 | .62 | | |
| N-AC | 5.0 | 4×10⁵ | 23.5 | T | 200 | | | 515 | 692 | .52 | .60 | | |
| H-P | 2.7 | 2×10⁴ | 23.5 | T | 200 | MIBK | 5 | 361 | 577 | .39 | .45 | | |
| H-P | 2.7 | 2×10⁴ | 23.5 | T | 200 | | | 346 | 508 | .38 | .41 | | |
| S | 1.4 | 5×10⁵ | 4.9 | T | 49 | | | 254 | 366 | | .25 | | |
| N-AC | 6.8 | 4×10⁵ | 87 | T | 680 | | | | 669 | | .62 | | |
| S(92)AN(8) | 0.55 | 1×10⁵ | 4.8 | T | 48 | MP | 0.82 | 131 | 169 | | .10 | | |

See Table IV for footnotes, 1, 2, 3, and 4.

TABLE IV

| Polymer [1] | Polymer Gms. | Polymer Approx. M.W. | $Co_2(CO)_8$, gms. | Solvent [2] | Ml. | Additive [3] | Ml. | $H_{io}$ 1,000 oe. | $H_{io}$ 2,000 oe. | Br/Bs 1,000 oe. | Br/Bs 2,000 oe. |
|---|---|---|---|---|---|---|---|---|---|---|---|
| PPG(4025)-MM | 2.7 | 2×10⁴ | 23.5 | T | 200 | MIBK | 5 | 311 | 350 | .48 | .44 |
| PPG(4025)-MM | 2.7 | 2×10⁴ | 23.5 | T<br>X | 188<br>39 | | | 235 | 288 | .31 | .30 |
| PPG(4025)-DV | 2.7 | 2×10⁴ | 23.5 | T | 188 | | | 273 | 304 | .42 | 3.9 |
| PEG(6000)-MM | 2.7 | 2×10⁴ | 23.5 | T | 188 | CA | 2 | 308 | 369 | .42 | .42 |
| AS | 2.4 | 2×10³ | 21 | T<br>X | 150<br>3 | | | 119 | 135 | .37 | .37 |

[1] MMA—methyl methacrylate.
EA—ethyl acrylate.
VP—vinyl pyrrolidone.
BMA—butyl methacrylate.
N-AD—polychloroprene (Du Pont AD-10).
AX—phathalic acid—glycerol—pentaerythritol polyester; castor oil, styrene and methyl methacrylate modified (U.S. 2,727,870).
N-AC—polychloroprene (Du Pont AC soft), contains approximately 2% by weight of tetraethylthiuram disulfide.
VA—vinyl acetate.
HPMA—hydroxypropyl methacrylate.
HEMA—hydroxyethyl methacrylate.
HMA—hexyl methacrylate.
H-P—chlorosulfonated polyethylene (approximately 20,000 M.W.) (Du Pont Hypalon 30) treated with piperidine.
S—styrene.
AN—acrylonitrile.
PPG—polypropylene glycol (molecular weight).
MM—diphenylmethane diisocyanate.
DV—diisocyanate capped polyester (1000 M.W.) (Spencer-Kellogg DV-1088).
PEG—polyethylene glycol (molecular weight).
AS—isophthalic acid—glycerol polyester, soy bean oil modified.

[2] CB—chlorobenzene.
T—toluene.
X—xylene.
D—dioxane.

[3] MIBK—methyl isobutyl ketone.
MP—methyl pyrrolidone.
SBA—sec.-butyl acetate.
BS—di-n-butyl sulfone.
CA—Cellosolve acetate.

[4] $\frac{\text{grams of } Co_2(CO)_8}{\text{ml. of solvent}}$

Table V (A) is concerned with a variety of additives. Each experiment was carried out in the following manner: In a flask, as described in Example I, was introduced 23.5 grams of dicobalt octacarbonyl and toluene to give 235 ml. of solution. The solution was washed with 200 ml. of water. To the washed solution was then added 2.7 grams of a methyl methacrylate:ethyl acrylate:vinyl pyrrolidone (37:69:1) polymer ($5\times10^{-4}$ molecular weight) dissolved in about 15 ml. of toluene. The appropriate amount of the additive was then introduced. The mixture was then heated to reflux and the reflux condition maintained until the evolution of carbon monoxide ceased. The products for the most part were black dispersions and were tested for their magnetic properties.

The results reported in Table V (B) were obtained from experiments carried out in the following manner: Into a flask, as described in Example I, was introduced 300 ml. of toluene containing 1.4 grams of a methyl methacrylate:ethyl acrylate:vinyl pyrrolidone (37:69:1) polymer of an approximate molecular weight of about $5\times10^{-4}$. Also added was the appropriate amount of additive. The mixture was brought to reflux and a solution of 10 grams of dicobalt octacarbonyl in 300 ml. of toluene was added at a uniform rate over a period of about 40 minutes. The reflux was maintained until the evolution of carbon monoxide ceased. The resulting black dispersions were examined for their magnetic properties.

TABLE V(A)

| Additive | Ml. | $H_{ic}$, 2,000 | Br/Bs |
|---|---|---|---|
| None [1] | ---------- | 280 | 0.56 |
| n-Butanol | 0.5 | [2] 469 | 0.66 |
| Do | 2.0 | [2] 599 | 0.65 |
| Do | 4.0 | [2] 762 | 0.67 |
| n-Hexanol | 3.0 | [2] 321 | 0.63 |
| Do | 4.0 | [2] 365 | 0.66 |
| n-Propanol | 2.0 | 415 | 0.58 |
| Sec.-butanol | 2.0 | 423 | 0.60 |
| Do | 4.0 | 516 | 0.64 |
| Iso-butanol | 3.0 | 446 | 0.58 |
| n-Hexanethiol | 0.5 | [2] 478 | 0.56 |
| Do | 2.0 | [2] 590 | 0.59 |
| None | ---------- | 234 | 0.56 |
| Isobutyl acetate | 25 | 538 | 0.65 |
| Propyl propionate | 25 | 364 | ---------- |
| Diethyl carbonate | 25 | 508 | 0.65 |
| Methyl isobutyl ketone | 25 | 481 | 0.63 |
| Methyl isobutyl ketone [3] | 25 | 461 | 0.62 |
| Cyclopentanone | 2 | 392 | 0.56 |
| None | ---------- | 235 | 0.5 |
| Butyrolactone | 0.5 | 488 | 0.6 |
| Benzonitrile | 2 | 315 | 0.5 |
| Adiponitrile | 0.2 | 342 | 0.5 |
| Dimethyl ether of dimethylene glycol | 2 | 446 | 0.5 |
| Dimethyl ketal of acetone | 5 | 561 | 0.6 |
| Methyl benzoate | 2 | 342 | 0.6 |
| Acetophenone | 10 | 504 | 0.65 |

[1] In each series, one run was carried out without additive to serve as a standard. The standard appears as the first run of each group.
[2] $H_{ic}$ 1,000.
[3] 0.90 g. polymer used.

TABLE V(B)

| Additive | Ml. | $H_{ic}$, 1,000 | Br/Bs |
|---|---|---|---|
| None | ---------- | 100 | 0.14 |
| Sec.-butyl acetate | 25 | 270 | 0.24 |
| Do | 50 | 300 | 0.31 |
| Do | 100 | 340 | 0.35 |
| Methyl isobutyl ketone | 25 | 460 | 0.41 |
| Do | 50 | 520 | 0.41 |
| Do | 100 | 880 | 0.46 |

Figure 5:
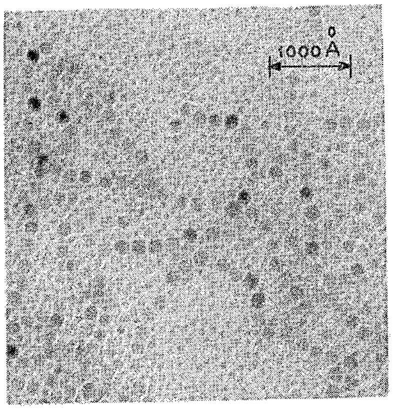
Figure 6:
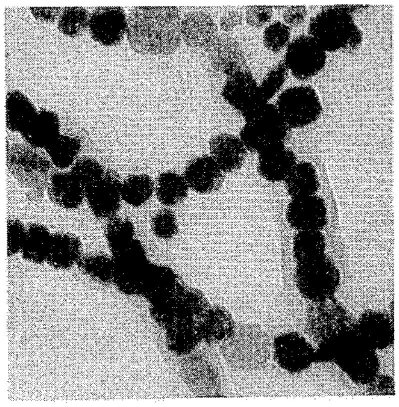
Figure 7:
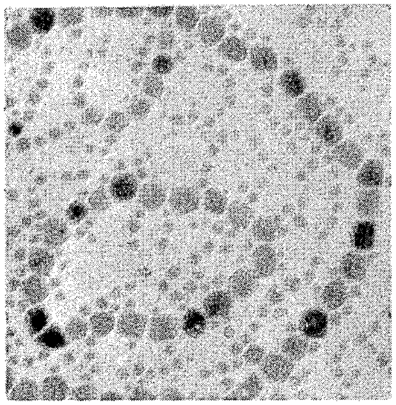
Figure 8:
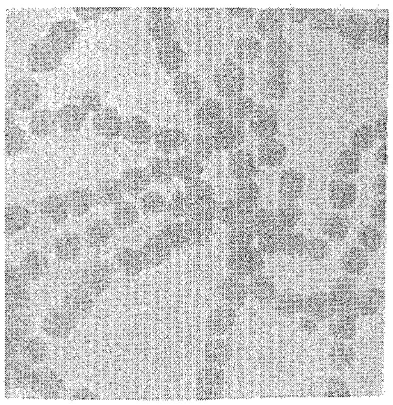
Figure 9:
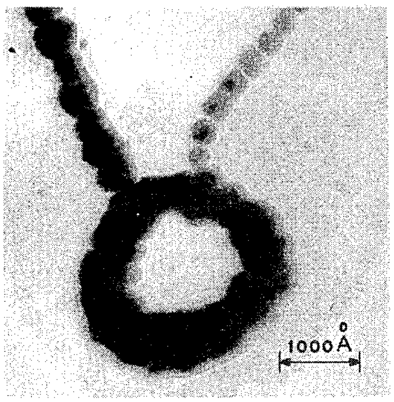

FIGURES 2, 5 and 7 illustrate products in which all the particles are not involved in chaining. The appearance of the chains in FIG. 2 is fairly common to photomicrographs which are taken during the course of the run and after about 50% of the metal compound has decomposed. In FIG. 7, it is evident that the small particles are beginning to line up to form chains. In the other figures, the particles have predominantly progressed to a size at which the particles are mostly in chains.

While the polymers which must be used to prepare the novel compositions are restricted to those described, once the metal polymer composition has been prepared, the polymer can be replaced for the most part by another polymer.

The exchange may be achieved by leaching away the polymer with a solvent, dispersing the resulting polymer-metal composition in a different polymer or solution of a different polymer, and then further extracting this composition with solvent. Partition between the metal polymer composition and the solvent can be achieved by various methods, such as centrifugation, sedimentation, etc. Usually, little of the original polymer will remain. The following example will illustrate the method. The example can be repeated removing more of the polymer.

*Example A*

A sample containing a slurry of 1.87 grams of cobalt particles, 0.18 gram of polymer (methyl methacrylate: acrylate:vinyl pyrrolidone) and 9.65 grams of toluene was mixed with 55.5 grams of a chloroform-toluene solution, containing 5.8 parts of chloroform to 1 part of toluene, and vigorously shaken. The mixture was allowed to settle and the supernatant liquid carefully decanted. The remaining slurry contained 14.4 grams: 12.9 grams of volatile material (toluene and chloroform), 1.87 grams of cobalt particles and 0.066 gram of polymer. Evaporation of the solvent yielded a product containing 96.6% cobalt and having excellent magnetic properties.

By introducing a different polymer into the extracting solution, polymer exchange results.

The polymer compositions prepared according to the method of this invention are unique. Each particle as it is formed is encapsulated with polymer. Secondly, stable dispersions of the particles can be obtained in a low dielectric constant medium (less than 20). By stable dispersions is meant a particulate system in which sedimentation is not observed in a period of 1 day under ambient conditions and normal gravitational force. Thirdly, the particles are of relatively uniform size. Fourthly, and most significant, because prior to this time such a composition was unknown, the particles exist in an organized arrangement. The organized arrangement results in shape anisotropy, which signifiicantly enhances the coercive force of the metal.

The dispersed particles are easily rotated in the dispersion. Polymer particle films can be dried in a magnetic field and can become magnetically anisotropic in directions parallel and perpendicular to the orienting field. By orienting the particles, relatively square hysteresis loops can be obtained. Therefore, when the field is removed, a high percentage of the maximum saturation will remain. The orientation occurs even though the particles are frequently nearly spherical and of small size. The orientation of the chains is greatly enhanced by the presence of the organized arrangement as compared to particles randomly dispersed. The effects of such orientation can be profound and have no counterpart in systems prepared by other than this invention.

In systems which have a large percentage of the metal present as particles which are not in chains, the contributions of the coercive force of the chain may not be significant. Moreover, the coercive force of chains will not be high in every instance. In preparations where relatively large separations exist between the particles, coercive forces will be low.

The preferred preparations of this invention are those having a coercive force without orientation of at least 350 oe. in a 1,000 oe. field. Usually, these compositions will also have a remanence ratio of 0.4 or more. Generally, the coercive force for the preferred compositions will be in the range of about 400 oe. to 900 oe. and preferably in the range of about 450 oe. to 700 oe.

The compositions containing the cobalt have a wide variety of uses. The metal dispersed in the polymer provides a convenient and unique way for coating magnetic recording devices, such as tapes, discs, drums, etc. The small size of the particle permits a smooth coat and a magnetic recording medium of greatly reduced noise level. Moreover, high pulse-packing density can be obtained. The high saturation magnetization of the metal particles gives enhanced output, resulting in excellent high and low frequency response.

Permanent magnets may be prepared with the compositions containing the cobalt particles. The metal polymer composition may be embedded in a variety of polymers to form a solid material. These permanent magnets can be of light weight and permit easy machineability, moldability and fashioning.

In order to demonstrate the novel properties of the cobalt particles, a magnetic recording tape was prepared and compared to a commercially available tape.

The ferromagnetic cobalt particles were prepared in the following manner:

Into a vessel, fitted with stirring and condensing means, which was flushed with nitrogen, was introduced 125 parts of dicobalt octacarbonyl in 1,000 parts of toluene. The solution had been water washed. About 2.7 parts of methyl isobutyl ketone and 4.7 parts of a MMA:EA:VP (37:69:1) polymer added and the mixture heated to a vigorous reflux. The heating was continued for a short time after the theoretical amount of carbon monoxide had evolved. The product was then filtered in a Buchner funnel and concentrated to a 25% solids suspension, containing a metal to polymer ratio of about 9:1.

Preparation of the tape:

To the above mixture was added a solution of 6 parts of Saran F220 (vinylidene chloride: acrylonitrile copolymer) in 162 parts of methyl ethyl ketone to give a metal to polymer ratio of 4:1 and a slurry containing 15% solids. The mixture was then milled and coated with a knife edge onto Mylar (Du Pont polyester) film to give a coating thickness of about 0.2 mil. The product was then dried and its properties determined.

The following data is a comparison of a superior commercial ferric oxide tape and the novel cobalt tape:

TABLE VI

| Magnetic property | Ampex 733 | Cobalt tape |
|---|---|---|
| Coercive force, oe | 300 | 500 |
| Remanence Br, gauss | 1,200 | 2,500 |
| Magnetization Bm, gauss | 1,400 | 4,000 |
| Remanence ratio, Br/Bm | 0.86 | [1] 0.62 |
| 1¼% dist., 250 c.p.s., db | 3.1 | 12 |
| Bulk erased noise, db | −75.2 | −84.0 |
| Bias erased noise, db | −69.2 | −80.0 |
| S/N ratio, db [2] | 89 | 99 |
| Dynamic range | 72 | 92 |

[1] The tape was not oriented and a significant enhancement in remanence ratio would result if it had been oriented.
[2] Signal to noise ratio.

The tape prepared with cobalt particles has an excellent dynamic range as compared to a commerical tape and, moreover, has a surprisingly low noise level. When desired, the cobalt particle dispersions may be spread in thinner coatings than are ordinarily used with iron oxide. The use of thinner coatings has the advantages of greatly increasing the high frequency response. The higher remanent magnetization of ferromagnetic cobalt particles permits excellent base response even with a thin coating thickness. The effects of varying coating thickness and of remanent magnetization on magnetic recording are well known in the art.

As will be evident to those skilled in the art, various modifications on this process can be made or followed, in the light of the foregoing disclosure and discussion, without departing from the spirit or scope of the disclosure or from the scope of the following claims.

We claim:

1. A method of preparing cobalt particles which are:
(1) discrete,
(2) dispersed in an organic medium,
(3) individually encapsulated with a polymeric envelope as evidenced by electron photomicrograph,
(4) of a size in the range of about 100 to 1,000 A.,
(5) existing in units wherein the particles are organized in a linear arrangement, each unit having at least 5 particle members, which comprises:

decomposing in solution at a temperature in the range of about −50° to 200° C., an organo-cobalt compound, wherein cobalt is coordinately bonded to carbonyl, which is present in an amount sufficient to form metal particles of at least 100 A., the solvent of said solution having as a major component based on the total weight of solvent from 60 to 100 percent of an inert organic solvent of dielectric constant of from 1.7 to 6 and a minor component in from 0 to 40 percent of an organic material having a greater dipole moment than the major component of the solvent, said dipole moment being in the range of 1 to 5.5 D., the amount of said minor component diminishing with increasing dipole moment, and dissolved in said solvent from 0.5 to 15 parts of polymer per part of cobalt of a flexible organic polymer, said polymer having at least 1,000 molecular weight, at least 0.1 per cent to about 45 percent by weight of other than saturated aliphatic hydrocarbon, an average dipole moment per atom other than hydrogen in the range of about 0.02 to 1.0 D. and being capable of being partially adsorbed on the cobalt particle surface and having at least a substantial portion by weight of the polymer away from the surface.

2. A method according to claim 1 in which the organo-cobalt compound is solely coordinately bonded to carbonyl and is thermally decomposed at a temperature in the range of about 50° to 200° C.

3. A method according to claim 1 in which the organo-cobalt compound is solely coordinately bonded to carbonyl and is thermally decomposed at a temperature in the range of about 100° to 150° C.

4. A method of preparing cobalt particles which are:
(1) discrete,
(2) dispersed in an organic medium,
(3) individually encapsulated with a polymeric envelope as evidenced by electron photomicrograph,
(4) of a size in the range of about 100 to 750 A.,
(5) existing in units wherein the particles are organized in a linear arrangement, each unit having at least 5 particle members, which comprises:

thermally decomposing in solution at a temperature in the range of about 85° to 175° C., a soluble cobalt carbonyl compound in which cobalt is coordinately bonded to carbonyl and present in an amount sufficient to form metal particles of at least 100 A., said solution containing from 0.5 to 15 parts of polymer per part of cobalt, said polymer being an addition polymer of at least about 5,000 molecular weight and having an average dipole moment per atom of other than hydrogen in the range of about 0.02 to 1.0 D./atom, and the solvent of said solution having as a major component from 60 to 100 percent by weight of an inert organic solvent of dielectric constant of from 1.7 to 6.0, and as a minor component from 0 to 40 percent by weight of an organic material having a greater dipole moment than the major component of said solvent, said dipole moment being in the range of 1.5 to 3.0 D., but not greater than the dipole moment of the most polar group of said polymer.

5. A method according to claim 4 wherein the major component of the solvent has a dielectric constant in the range of about 1.7 to 2.5.

6. A method according to claim 4 wherein at least 85 percent of the functional groups present in the polymer have a dipole moment of from 1 to 2 D.

7. A method according to claim 4 wherein at least 85 percent of the functional groups present in the polymer have a dipole moment of from 1 to 2 D. and from 0.5 to 10 percent of the functional groups present have dipole moments greater than 2.5 D.

8. A method of preparing cobalt particles which are:
(1) discrete,
(2) dispersed in an organic medium,
(3) individually encapsulated with a polymeric envelope as evidence by electron photomicrograph,
(4) of a size in the range of about 100 to 750 A.,
(5) existing in units wherein the particles are organized in a linear arrangement, each unit having at least 5 particle members, which comprises:

thermally decomposing in solution at a temperature in the range of about 85° to 175° C., a cobalt carbonyl compound in which cobalt is coordinately bonded to carbonyl and present in an amount sufficient to form metal particles of at least 100 A., dissolved in said solution from 0.5 to 15 parts of polymer per part of cobalt, said polymer being characterized as a condensation polymer of at least 1,000 molecular weight and having an average dipole moment per atom in the polymer chain in the range of about 0.1 to 1.8 D., with the proviso that there must be areas of high and low polarity, and the solvent of said solution having as a major component from 60 to 100 percent by weight of an inert organic solvent of dielectric constant of from 1.7 to 6.0, and as a minor component from 0 to 40 percent by weight of an organic material having a greater dipole moment than the major component of said solvent, said dipole moment being in the range of 1.5 to 3.0 D., but not greater than the dipole moment of the most polar group of said polymer.

9. A method of preparing cobalt particles which are:
(1) discrete,
(2) dispersed in an organic medium,
(3) individually encapsulated with a polymeric envelope as evidenced by electron photomicrograph,
(4) of a size in the range of about 100 to 750 A.,
(5) existing in units wherein the particles are organized in a linear arrangement, each unit having at least 5 particle members;

which comprises:

thermally decomposing in solution at a temperature in the range of about 85° to 175° C., a cobalt carbonyl compound in which cobalt is solely coordinately bonded to carbonyl and present in an amount sufficient to form metal particles of at least 100 A., wherein the solvent of said solution is an aromatic hydrocarbon solvent containing less than 25 weight percent of an organic ketone having a dipole moment in the range of 1.5 to 3.0 D., and dissolved in said solution is from 0.5 to 15 parts of polymer per part of cobalt, said polymer being characterized as an addition polymer of at least about 5,000 molecular weight comprised of addition polymerizable ester monomers and from 0.2 to 10 percent by number of additional polymerizable amide monomers, wherein the average dipole moment per atom of other than hydrogen is in the range of about 0.02 to 1.0 D./atom.

10. A method of preparing cobalt particles which are:
(1) discrete,
(2) dispersed in an organic medium,
(3) individually encapsulated with a polymeric envelope as evidenced by electron photomicorgraph,
(4) of a size in the range of about 100 to 750 A.,
(5) existing in units wherein the particles are organized in a linear arrangement, each unit having at least 5 particle members;

which comprises:

thermally decomposing in solution at a temperature in the range of about 85° to 175° C., a cobalt carbonyl compound in which cobalt is solely coordinately bonded to carbonyl and present in an amount sufficient to form metal particles of at least 100 A., wherein the solvent of said solution is an aromatic hydrocarbon solvent having less than 25 weight percent of an organic ketone having a dipole moment in the range of 1.5 to 3.0 D., and dissolved in said solution is from 0.5 to 15 parts of polymer per part of cobalt, said polymer being characterized by being a polychloroprene of at least about 5,000 molecular weight, wherein the average dipole moment per atom of other than hydrogen is in the range of about 0.02 to 1.0 D./atom.

11. A method of preparing cobalt particles which are:
(1) discrete,
(2) dispersed in an organic medium,
(3) individually encapsulated with a polymeric envelope as evidenced by electron photomicrograph,
(4) of a size in the range of about 100 to 750 A.,
(5) existing in units wherein the particles are organized in a linear arrangement, each unit having at least 5 particle members;

which comprises:

thermally decomposing in solution at a temperature in the range of about 85° to 175° C., a cobalt carbonyl compound in which cobalt is solely coordinately bonded to carbonyl and present in an amount sufficient to form metal particles of at least 100 A., wherein the solvent of said solution is an aromatic hydrocarbon solvent having less than 25 weight percent of an organic ketone having a dipole moment in the range of 1.5 to 3.0 D., and dissolved in said solution is form 0.5 to 15 parts of polymer per part of cobalt, said polymer being characterized by being of at least about 5,000 molecular weight and comprised of addition polymerizable ester monomers and up to 15 percent by number of addition polymerizable monomers having hydroxyl groups, wherein said polymer has an average dipole moment per atom of other than hydrogen in the range of about 0.02 to 1.0 D./atom.

12. A method of preparing cobalt particles which are:
(1) discrete,
(2) dispersed in an organic medium,
(3) individually encapsulated with a polymeric envelope as evidenced by electron photomicrograph,
(4) of a size in the range of about 100 to 750 A.,
(5) existing in units wherein the particles are organized in a linear arrangement, each unit having at least 5 particle members;

which comprises:

thermally decomposing in a polymeric solution at a temperature in the range of about 85° to 175° C., a cobalt carbonyl compound in which cobalt is solely coordinately bonded to carbonyl and present in an amount sufficient to form metal particles of at least 100 A., wherein the solvent of said solution is an aromatic hydrocarbon solvent having less than 25 weight percent of an organic ketone having a dipole moment in the range of 1.5 to 3.0 D., and dissolved in said solution from 0.5 to 15 parts of polymer per part of cobalt, said polymer being characterized by being a polyethylene which has been chlorosulfonated and then treated with an amine to form sulfonamides, wherein said polymer is of at least about 5,000 molecular weight and has an average dipole moment per atom of other than hydrogen in the range of about 0.02 to 1.0 D./atom.

13. A method of preparing cobalt particles which are:
(1) discrete,
(2) dispersed in an organic medium,
(3) individually encapsulated with a polymeric envelope as evidenced by electron photomicrograph,
(4) of a size in the range of about 100 to 750 A.,
(5) existing in units wherein the particles are organized in a linear arrangement, each unit having at least 5 particle members;

which comprises:

thermally decomposing in solution at a temperature in the range of about 85° to 175° C., a cobalt carbonyl compound in which cobalt is solely coordinately bonded to carbonyl and present in an amount sufficient to form metal particles of at least 100 A., wherein the solvent of said solution is an aromatic hydrocarbon solvent having less than 25 weight percent of an organic alcohol having a dipole moment in the range of 1.5 to 3.0 D., and dissolved in said solution from 0.5 to 15 parts of polymer per part of cobalt, said polymer being characterized as an addition polymer of at least about 5,000 molecular weight comprised of addition polymerizable ester monomers and from 0.2 to 10 percent by number of addition polymerizable amide monomers, wherein the average dipole moment per atom of other than hydrogen is in the range of about 0.02 to 1.0 D./atom.

14. A composition of matter consisting essentially of discrete cobalt particles of a size in the range of about 100 to 1,000 A. dispersed in an organic medium, individually encapsulated with a polymeric envelope, the polymer of said polymeric envelope having a molecular weight of at least 1,000 and an average dipole moment per atom of other than hydrogen in the range of about 0.02 to 1.0 D./atom, the polymer to metal weight ratio being at least about 0.02, and said particles existing as units having an organized linear arrangement, wherein each unit has at least 5 particle members.

15. A composition according to claim 14 wherein the particles are of a size in the range of about 150 to 750 A.

16. A composition according to claim 14 wherein the particles are of a size in the range of about 150 to 750 A. and said polymer is an addition polymer of at least 10,000 molecular weight.

17. A composition consisting essentially of a stable colloidal suspension which comprises at least 65 percent by weight of an inert solvent having from 60 to 100 percent by weight of an inert organic solvent of dielectric constant of from 1.7 to 6 and as a minor component from 0 to 40 percent by weight of an organic material having a greater dipole moment than the major component of the solvent, said dipole moment being in the range of about 1 to 5.5 D., and from 0.1 to 15 percent by weight of discrete cobalt metal particles of a size in the range of about 100 to 1,000 A., each particle being encapsulated in a polymeric envelope and existing in units having an organized linear arrangement, each unit having at least 5 particle members, the polymer of said polymeric envelope having at least 1,000 molecular weight and an average dipole moment per atom other than hydrogen in the range of about 0.02 to 1.0 D./atom, the polymer to cobalt metal weight ratio being in the range of about 0.5–5:1.

18. A composition according to claim 17 wherein said cobalt metal particles are of a size in the range of about 100 to 750 A., and said polymer has a molecular weight of at least about 10,000 and is comprised of at least 85 percent by number of addition polymerizable ester monomers, wherein the polymer has an average dipole moment per atom of other than hydrogen in the range of about 0.02 to 1.0 D./atom.

19. A composition according to claim 17 wherein said cobalt particles are of a size in the range of 100 to 750 A. and said polymer is a flexible addition polymer.

20. A magnetic impulse record member comprising a binding medium having therein particles having the following characteristics:
(a) cobalt metal,
(b) discrete and encapsulated in a polymeric medium, wherein the polymer of said polymeric medium has an average dipole moment per atom of other than hydrogen in the range of about 0.02 to 1.0 D./atom,
(c) of from about 100 to 1,000 A. in size, wherein at least 75 percent by weight of the metal is present as particles of not more than 50 percent difference in size from the mean size,
(d) predominantly single domain,
(e) and existing as units having an organized linear arrangement, wherein each unit has at least 5 particle members.

21. A magnetic impulse record member as described in claim 20 wherein the particles are of a size in the range of about 150 to 750 A.

22. A magnetic impulse record member as described in claim 20 wherein the particles are of a size in the range of about 150 to 750 A. and the intrinsic coercive force is at least 350 oersteds in a 1,000 oersted field.

23. A magnetic tape having a coercive force of at least 350 oersteds in a 1,000 oersted field comprising a binding medium having therein particles having the following characteristics:
(a) cobalt metal,
(b) discrete and individually encapsulated in a polymeric medium comprised of an acrylate polymer, wherein said acrylate polymer has an average dipole moment per atom of other than hydrogen in the range about 0.02 to 1.0 D./atom,
(c) of from about 100 to 750 A. in size, wherein at least 75 percent by weight of the metal is present as particles of not more than 50 percent difference in size from the mean size,
(d) predominantly single domain,
(e) and existing as units having an organized linear arrangement, wherein each unit has at least 5 particle members, wherein the particles comprise from 1 to 98 weight percent of the combined weight of binding medium and particles.

24. A magnetic tape comprising a binding medium having therein particles having the following characteristics:
(a) cobalt metal,
(b) discrete and individually encapsulated in a polymeric medium comprising a copolymer of methacrylate and vinyl pyrrolidone monomers, wherein said polymer has an average dipole moment per atom of other than hydrogen in the range of about 0.02 to 1.0 D./atom,
(c) of from about 100 to 750 A. in size, wherein at least 75 percent by weight of the metal is present as particles of not more than 50 percent difference in size from the mean size,
(d) predominantly single domain,
(e) and existing as units having an organized linear arrangement, wherein each unit has at least 5 particle members, wherein the particles comprise from 1 to 98 weight percent of the combined weight of binding medium and particles.

(References on following page)

References Cited by the Examiner

UNITED STATES PATENTS

| | | | |
|---|---|---|---|
| 1,805,199 | 5/1931 | Alleman | 44—51 |
| 2,635,041 | 4/1953 | Hansley et al. | 44—51 |
| 2,651,105 | 9/1953 | Neel | 252—62.5 |
| 2,927,849 | 3/1960 | Greblick et al. | 44—51 |
| 2,947,646 | 8/1960 | Devaney et al. | 260—41 |
| 2,974,104 | 3/1961 | Paine et al. | 252—62.5 |
| 2,989,415 | 6/1961 | Horton et al. | 252—62.5 |
| 3,014,818 | 12/1961 | Campbell | 252—513 |
| 3,073,785 | 1/1963 | Angelo | 252—513 |

FOREIGN PATENTS

| | | |
|---|---|---|
| 616,839 | 1/1949 | Great Britain. |

OTHER REFERENCES

Horn, Acrylic Resins, Reinhold Publ. Corp. 1960.

Paine et al., Fine-Particle Magnets, Electrical Engineering, volume 76, October, 1957, pages 851–857. TK 1.A61.

Smith, Vinyl Resins, Reinhold Publ. Corp., 1958.

TOBIAS E. LEVOW, *Primary Examiner.*

MAURICE A. BRINDISI, *Examiner.*